United States Patent
Tamura et al.

(10) Patent No.: US 6,765,070 B2
(45) Date of Patent: Jul. 20, 2004

(54) COPOLYMERIZED POLYESTER RESIN COMPOSITION AND STRETCHED FILM

(75) Inventors: Koichi Tamura, Yokohama (JP); Fumio Keitoku, Yokkaichi (JP); Toshio Kanbe, Yokkaichi (JP); Yasuhiro Tomita, Nagahama (JP)

(73) Assignees: Mitsubishi Chemical Corporation, Tokyo (JP); Mitsubishi Plastics, Inc., Tokyo (JP)

( * ) Notice: Subject to any disclaimer, the term of this patent is extended or adjusted under 35 U.S.C. 154(b) by 13 days.

(21) Appl. No.: 10/140,186

(22) Filed: May 8, 2002

(65) Prior Publication Data

US 2002/0186120 A1 Dec. 12, 2002

(30) Foreign Application Priority Data

May 18, 2001 (JP) ........................................ 2001-149648

(51) Int. Cl.[7] .............................................. C08L 67/02
(52) U.S. Cl. ........................................ 525/444; 524/439
(58) Field of Search .......................... 525/444; 524/539

(56) References Cited

U.S. PATENT DOCUMENTS 6,197,856 B1    3/2001    Dean et al.

FOREIGN PATENT DOCUMENTS

| EP | 0 741 161 | 11/1996 |
|---|---|---|
| JP | 57-159618 | 10/1982 |
| JP | 59-97175 | 6/1984 |
| JP | 63-114629 | 5/1988 |
| JP | 6-122152 | 5/1994 |
| JP | 7-216109 | 8/1995 |
| JP | 8-27260 | 1/1996 |
| JP | 8-239460 | 9/1996 |
| JP | 10-87851 | 4/1998 |
| JP | 2001-64412 | 3/2001 |
| JP | 2001-96616 | * 4/2001 |
| JP | 2002-20470 | 1/2002 |
| JP | 2002-20471 | 1/2002 |
| JP | 2002-20594 | 1/2002 |
| JP | 2002-20595 | 1/2002 |

OTHER PUBLICATIONS

Patent Abstracts of Japan, JP 2001–96616, Apr. 10, 2001.
Patent Abstracts of Japan, JP 8–27260, Jan. 30, 1996.

* cited by examiner

*Primary Examiner*—Patricia A. Short
(74) *Attorney, Agent, or Firm*—Oblon, Spivak, McClelland, Maier & Neustadt, P.C.

(57) ABSTRACT

A copolymerized polyester resin composition comprising the following polyethylene terephthalate resin (A) and a polybutylene terephthalate resin (B), wherein the proportion of the resin (A) is from 50 to 95 wt %, and the proportion of the resin (B) is from 5 to 50 wt %, based on the total amount of the resins (A) and (B):

Resin (A): a copolymerized polyethylene terephthalate resin, having a dicarboxylic acid component containing terephthalic acid as the main component and a diol component containing ethylene glycol as the main component copolymerized, wherein the dicarboxylic acid component contains isophthalic acid in an amount of from 3 to 30 mol % based on the total dicarboxylic acid component, and the diol component contains a cyclohexane dimethanol in an amount of from 3 to 40 mol % based on the total diol component.

39 Claims, No Drawings

COPOLYMERIZED POLYESTER RESIN COMPOSITION AND STRETCHED FILM

The present invention relates to a copolymerized polyester resin composition and a stretched film. Particularly, it relates to a copolymerized polyester resin composition whereby a heat shrinkable film excellent in heat shrinkability, mechanical strength, transparency, solvent adhesive properties, etc. can be obtained, and a stretched film made thereof.

Heretofore, heat shrinkable films have been widely used, for example, as packaging materials, binding materials, covering materials, sealing materials or labeling materials, by utilizing such a nature that when heated, they shrink to provide a binding force. Particularly, an attention has been drawn to heat shrinkable films made of monoaxially or biaxially stretched films of polyethylene terephthalate resins in view of the excellent mechanical strength, chemical properties, transparency, gas barrier properties, safety and sanitation and the like, of polyester resins. They have shown a rapid increase in demand along with a recent increase in demand of bottles for beverages, made of polyethylene terephthalate resins, as labeling materials to cover the outer surfaces of such bottles, as they are advantageous from the viewpoint of recycling of bottles, since the labeling materials are of the same material as the bottles.

However, polyethylene terephthalate resins are crystalline, and at the same time, their glass transition temperatures and heat shrinkage-initiating temperatures are high. Further, the shrinkage is inadequate. There is a further problem that no adequate bond strength can be obtained by solvent bonding, and the bond strength tends to decrease as time passes.

On the other hand, in order to solve the above problems, a copolymerized polyester obtained by copolymerizing terephthalic acid and/or isophthalic acid, naphthalene dicarboxylic acid, ethylene glycol and other diol components (see e.g. JP-A-8-239460), a copolymerized polyester made of terephthalic acid, ethylene glycol, cyclohexane dimethanol and butanediol (see e.g. JP-A-8-27260) or a heat shrinkable polyester film made of a resin composition comprising a polyethylene terephthalate polyester having neopentyl glycol copolymerized, a polybutylene terephthalate and a polyethylene terephthalate (see e.g. JP-A-7-216109) has, for example, been proposed.

JP-A-59-97175 discloses a polyester shrinkable label excellent in low temperature heat shrinkability, which is made of an aromatic dicarboxylic acid component and a diol component, wherein the diol component comprises from 50 to 99 wt % of a copolyester wherein 1,4-cyclohexanedimethanol is present in an amount of from 10 to 40 mol %, and from 1 to 50 wt % of polybutylene terephthalate.

However, by a study conducted by the present inventors, it has been found that it is impossible to obtain a heat shrinkable polyester film which fully satisfies the requirements for heat shrinkage, bond strength by a solvent, transparency, film strength, etc. even by means of the above copolymerized polyesters or resin compositions. The present invention has been made under these circumstances, and it is an object of the present invention to provide a copolymerized polyester resin composition whereby a heat shrinkable film excellent in the heat shrinkability, mechanical strength, transparency, solvent bonding properties, etc., can be obtained, and a stretched film made of such a resin composition.

The present inventors have conducted an extensive research and as a result, have found that a polyester resin composition comprising a certain specific copolymerized polyethylene terephthalate resin obtained by using isophthalic acid and cyclohexane dimethanol as copolymerized components, and a polybutylene terephthalate resin in certain specific proportions, is capable of attaining the above object. The present invention has been accomplished on the basis of this discovery.

Namely, in a first aspect, the present invention provides a copolymerized polyester resin composition comprising the following polyethylene terephthalate resin (A) and a polybutylene terephthalate resin (B), wherein the proportion of the resin (A) is from 50 to 95 wt %, and the proportion of the resin (B) is from 5 to 50 wt %, based on the total amount of the resins (A) and (B):

Resin (A): a copolymerized polyethylene terephthalate resin, having a dicarboxylic acid component containing terephthalic acid as the main component and a diol component containing ethylene glycol as the main component copolymerized, wherein the dicarboxylic acid component contains isophthalic acid in an amount of from 3 to 30 mol % based on the total dicarboxylic acid component, and the diol component contains a cyclohexane dimethanol in an amount of from 3 to 40 mol % based on the total diol component.

In a second aspect, the present invention provides a stretched film made of such a resin composition.

In a third aspect, the present invention provides a heat shrinkable film made of such a resin composition.

Now, the present invention will be described in further detail with reference to the preferred embodiments.

The copolymerized polyester resin composition of the present invention (hereinafter referred to simply as the resin composition) comprises the specific copolymerized polyethylene terephthalate resin (A) and the polybutylene terephthalate resin (B).

In the present invention, the copolymerized polyethylene terephthalate resin (A) (hereinafter sometimes referred to as the resin (A)) is a copolymerized polyethylene terephthalate resin, having a dicarboxylic acid component containing terephthalic acid as the main component and a diol component containing ethylene glycol as the main component copolymerized, wherein the dicarboxylic acid component contains isophthalic acid in an amount of from 3 to 30 mol % based on the total dicarboxylic acid component, and the diol component contains a cyclohexane dimethanol in an amount of from 3 to 40 mol % based on the total diol component.

In the forgoing, "containing terephthalic acid as the main component" means that at least 50 mol % of the total dicarboxylic acid component is terephthalic acid, and the proportion of terephthalic acid in the total dicarboxylic acid component is preferably at least 70 mol %, more preferably at least 75 mol %. Likewise, "containing ethylene glycol as the main component" means that at least 50 mol % of the total diol component is ethylene glycol, and the proportion of ethylene glycol in the total diol component is preferably at least 65 mol %, more preferably at least 70 mol %.

If the copolymerized amount of isophthalic acid is less than 3 mol %, the heat shrinkability of the resulting film tends to be poor, and if the copolymerized amount of isophthalic acid exceeds 30 mol %, the mechanical strength of the resulting film tends to be poor. The copolymerized amount of isophthalic acid is preferably at least 4 mol %, more preferably at least 5 mol %. On the other hand, it is preferably at most 25 mol %, more preferably at most 20 mol %.

If the copolymerized amount of cyclohexane dimethanol is less than 3 mol %, the bond strength by a solvent, of the resulting film, tends to be poor, and if the copolymerized amount of cyclohexane dimethanol exceeds 40 mol %, the heat stability of the resulting resin composition tends to be low, and consequently, the mechanical strength of the resulting film tends to be poor. The copolymerized amount of cyclohexane dimethanol is preferably at least 5 mol %, more preferably at least 10 mol %. On the other hand, it is preferably at most 35 mol %, more preferably at most 30 mol %.

The cyclohexane dimethanol may, for example, be 1,1-cyclohexane dimethanol, 1,2-cyclohexane dimethanol, 1,3-cyclohexane dimethanol, or 1,4-cyclohexane dimethanol. Among them, 1,4-cyclohexane dimethanol is preferred.

In the present invention, the resin (A) may be one having a dicarboxylic acid component other than terephthalic acid and a diol component other than ethylene glycol further copolymerized, so long as the dicarboxylic acid component contains terephthalic acid as the main component, and the diol component contains ethylene glycol as the main component, wherein isophthalic acid satisfies the above-mentioned proportion as a dicarboxylic acid component, and a cyclohexane dimethanol satisfies the above-mentioned proportion as a diol component.

Specific examples of such a dicarboxylic acid component other than terephthalic acid and isophthalic acid, include aromatic dicarboxylic acids such as phthalic acid, phenylenedioxy diacetic acid, 4,4'-diphenylene dicarboxylic acid, 4,4'-diphenoxyethane dicarboxylic acid, 4,4'-diphenyl ether dicarboxylic acid, 4,4'-diphenylsulfone dicarboxylic acid, 1,5-naphthalene dicarboxylic acid and 2,6-naphthalene dicarboxylic acid, alicyclic carboxylic acids such as 1,3-cyclohexane dicarboxylic acid and 1,4-cyclohexane dicarboxylic acid, and alicyclic dicarboxylic acids such as malonic acid, succinic acid adipic acid, azelaic acid and sebacic acid. Further, in the present invention, the dicarboxylic acid component includes an ester-forming derivative such as an alkyl ester (carbon number: from about 1 to 4) at the stage of a starting material before being copolymerized.

Specific examples of the diol component other than ethylene glycol and a cyclohexane dimethanol, include aliphatic diols such as 1,2-propanediol, 1,3-propanediol, 1,4-butanediol, 1,5-pentanediol, 1,6-hexanediol, 1,10-decanediol, 2,2-dimethyl-1,3-propanediol and diethylene glycol, alicyclic diols such as 1,2-cyclohexanediol and 1,4-cyclohexanediol, and aromatic diols such as 4,4'-dihydroxybiphenyl, 2,2-bis(4'-hydroxyphenyl)propane, 2,2-bis(4'-β-hydroxyethoxyphenyl)propane, bis(4-hydroxyphenyl)sulfone and bis(4-β-hydroxyethoxyphenyl)sulfonic acid.

Further, the resin (A) in the present invention may have, polymerized thereto, a hydroxycarboxylic acid or an alkoxycarboxylic acid, such as glycolic acid, p-hydroxybenzoic acid or p-β-hydroxyethoxybenzoic acid, a monofunctional component such as stearic acid, stearyl alcohol, benzyl alcohol, benzoic acid, t-butylbenzoic acid or benzoyl benzoic acid, or a trifunctional or higher polyfunctional component such as tricarballic acid, hexane tricarboxylic acid, trimellitic acid, trimesic acid, pyromellitic acid, benzophenone tetracarboxylic acid, naphthalene tetracarboxylic acid, 1,2,6-hexanetriol, gallic acid, trimethylolethane, trimethylolpropane, glycerol, pentaerythritol, sorbitol, dipentaerythritol or polyglycerol.

As the resin (A), resins satisfying the above requirements may be used alone or in combination as a mixture of two or more of them.

In the present invention, the polybutylene terephthalate resin (B) (hereinafter sometimes referred to as the resin (B)) is a polybutylene terephthalate obtained by using a dicarboxylic acid component containing terephthalic acid as the main component and a diol component containing a butanediol as the main component, and it may be a homopolymer or copolymer.

In the foregoing, "containing terephthalic acid as the main component" means that at least 50 mol % of the total dicarboxylic acid component is terephthalic acid, and the proportion of terephthalic acid in the total dicarboxylic acid component is preferably at least 70 mol %, more preferably at least 75 mol %. Likewise, "containing a butanediol as the main component" means that at least 50 mol % of the total diol component is a butanediol, and the proportion of a butanediol in the total diol component is preferably at least 65 mol %, more preferably at least 70 mol %.

Such a butanediol may, for example, be 1,2-butanediol, 1,3-butanediol, 1,4-butanediol or 2,3-butanediol. Among them, 1,4-butanediol is preferred.

As the resin (B) in the present invention, it is preferred to employ a polybutylene terephthalate resin having isophthalic acid copolymerized in an amount of less than 50 mol % based on the total dicarboxylic acid component. In a case where isophthalic acid is copolymerized in an amount of less than 50 mol %, the transparency of the resulting film and its resistance against deterioration with time of the bond strength by a solvent, tend to improve. If isophthalic acid is copolymerized in an amount of at least 50 mol %, the mechanical strength of the resulting film tends to deteriorate. The copolymerized amount of isophthalic acid is preferably at least 1 mol %, more preferably at least 2 mol %. On the other hand, it is preferably at most 40 mol %, more preferably at most 30 mol %.

Further, as the resin (B) in the present invention, it is also preferred to employ a copolymerized polybutylene terephthalate resin having a polyalkylene ether glycol copolymerized in an amount of from 1 to 80 wt %. In a case where a polyalkylene ether glycol is copolymerized in an amount of less than 1 wt %, the temperature range wherein the resulting film is shrinkable, tends to be wide. If a polyalkylene ether glycol is copolymerized in an amount exceeding 80 wt %, production of the resin (B) itself tends to be difficult. The copolymerized amount of a polyalkylene ether glycol is preferably at least 2 wt %, more preferably at least 5 wt %. On the other hand, it is preferably at most 60 wt %, more preferably at most 30 wt %.

Specific examples of the polyalkylene ether glycol include polyethylene glycol, polypropylene glycol, polytrimethylene ether glycol, polytetramethylene ether glycol, polyhexamethylene ether glycol, and a block or random copolymer of ethylene oxide and propylene oxide. Among them, polytetramethylene ether glycol is preferred.

The number average molecular weight of the above polyalkylene ether glycol is usually from 500 to 3,000. It is preferably at least 500, more preferably at least 600. On the other hand, it is preferably at most 2,000, more preferably at most 1,500. If the number average molecular weight is less than 500, the resulting film tends to have inadequate bonding properties by a solvent, and if the number average molecular weight exceeds 3,000, the transparency of the resulting film tends to be low.

As the resin (B) in the present invention, it is preferred to employ a copolymerized polybutylene terephthalate resin having isophthalic acid copolymerized in an amount of less than 50 mol % based on the total dicarboxylic acid component and having a polyalkylene glycol copolymerized in an amount of from 1 to 80 wt %.

The resin (B) in the present invention may be one having a dicarboxylic acid component other than terephthalic acid and preferred isophthalic acid and a diol component other than butanediol and a preferred polyalkylene ether glycol further copolymerized, so long as the dicarboxylic acid component contains terephthalic acid as the main component, and the diol component contains a butanediol as the main component. In such a case, the dicarboxylic acid component other than terephthalic acid and isophthalic acid, and the diol component other than a butanediol and a polyalkylene ether glycol, may be ethylene glycol in addition to those mentioned above with respect to the resin (A).

As the resin (B) in the present invention, resins satisfying the above requirements may be used alone or in combination as a mixture of two or more of them. Specifically, for example, a polybutylene terephthalate homopolymer (B1), a polybutylene terephthalate resin (B2) having isophthalic acid copolymerized in an amount of less than 50 mol % based on the total dicarboxylic acid component, and a copolymerized polybutylene terephthalate resin (B3) having a polyalkylene ether glycol copolymerized in an amount of from 1 to 80 wt % in the polybutylene terephthalate resin, may be used in an optional combination in an optional ratio. Among such combinations, a combination of the resin (B1) and the resin (B3), or a combination of the resin (B2) and the resin (B3), is particularly preferred. In the former case, the weight ratio of the resin (B1) to the resin (B3) is usually from 1:9 to 8:2, preferably from 3:7 to 5:5. In the latter case, the weight ratio of the resin (B2) to the resin (B3) is usually from 2:8 to 7:3, preferably from 3:7 to 6:4. The weight ratio of the resin B(2) to the resin B(3) can be from 1:9 to 8:2. By such a combined use, the transparency of the resulting film and the resistance against deterioration with time of its bonding strength by a solvent, tend to be improved.

In the present invention, the above copolymerized polyethylene terephthalate resin (A) and the above polybutylene terephthalate resin (B) are produced basically by a conventional production method for a polyester resin from a dicarboxylic acid component containing phthalic acid as the main component and a diol component containing ethylene glycol or a butanediol as the main component.

Namely, (1) a direct polymerization method wherein a dicarboxylic acid component containing terephthalic acid as the main component and a diol component containing ethylene glycol or a butanediol as the main component, are esterified in an esterification reactor, and the obtained esterified reaction product is transferred to a polycondensation reactor and poly-condensed therein, (2) a transesterification method wherein a dicarboxylic acid component containing an ester-forming derivative of terephthalic acid as the main component and a diol component containing ethylene glycol or a butanediol as the main component, are subjected to a transesterification reaction in a transesterification reactor, and the obtained transesterification reaction product is transferred to a polycondensation reactor and poly-condensed therein, or (3) a continuous direct polymerization method comprising a step wherein a dicarboxylic acid component containing terephthalic acid as the main component is dispersed in a diol component containing ethylene glycol or a butanediol as the main component to obtain a slurry in a slurry preparation tank, a step wherein the above slurry is continuously added to the esterified reaction product or the transesterification reaction product obtained as described above in an esterification reactor, and a step wherein the obtained reaction product is continuously or stepwisely transferred to a polycondensation reactor and polycondensed therein, may be adopted.

Further, the resin obtained by the polycondensation reaction is usually drawn in a form of a strand from a drawing aperture provided at the bottom of the polycondensation reactor, and is cut by a cutter during or after cooling with water, to have a form of pellets. In the present invention, the pellets after the polycondensation are subjected to solid state polymerization by heat treatment, whereby a higher degree of polymerization can be attained, and it is also possible to reduce formation of e.g. acetaldehyde and low molecular weight oligomers as by-products.

The esterification reaction in the above production method is carried out at a temperature of from about 200 to 270° C. under a pressure of from about $1\times10^5$ to $4\times10^5$ Pa in the presence of an esterification catalyst such as diantimony trioxide or an organic acid salt of e.g. antimony, titanium, magnesium or calcium, as the case requires.

The above transesterification reaction is carried out at a temperature of from about 200 to 270° C. under a pressure of from about $1\times10^5$ to $4\times10^5$ Pa in the presence of a transesterification catalyst such as an organic acid salt of e.g. lithium, sodium, potassium, magnesium, calcium, manganese, titanium or zinc, as the case requires.

The above polycondensation reaction is carried out at a temperature of from about 240 to 290° C. under a reduced pressure of from about $1\times10^2$ to $2\times10^3$ Pa in the presence of a polycondensation catalyst, such as a metal oxide such as diantimony trioxide, germanium dioxide or germanium tetraoxide, or an organic acid salt of e.g. antimony, germanium, zinc, titanium or cobalt, and in the presence of a phosphorus compound, such as phosphoric acid, phosphorous acid, hypophosphorous acid, or an ester or an organic salt thereof.

When the copolymerized polyethylene terephthalate resin (A) and the polybutylene terephthalate resin (B) have crystallizability, the above-mentioned polycondensation reaction may be followed by solid state polymerization. Such solid state polymerization is carried out at a temperature of from 180 to 240° C. in an atmosphere of an inert gas such as nitrogen gas or under a reduced pressure of from about $1\times10^2$ to $2\times10^3$ Pa, after preliminary crystallization by heating at a temperature of from about 120 to 200° C. for at least 1 minute.

Further, as the resin (A) and the resin (B), not only the polycondensed materials are used directly, but also pulverized products of recovered products from market, or discard or substandard products formed in the process for molding such materials into various molded products such as films, fibers, shaped containers or bottles, may be used. Such pulverized products may be used as they are, or may be used after melt-molded into a pellet form.

In the present invention, the intrinsic viscosity of the copolymerized polyethylene terephthalate resin (A) is usually from 0.4 to 1.5 dl/g, preferably from 0.5 to 1.2 dl/g, more preferably from 0.6 to 1.0 dl/g, as measured at 30° C. in a mixed solvent of phenol/1,1,2,2-tetrachloroethane (weight ratio=1/1), from the viewpoint of e.g. the mechanical strength of the resulting resin composition. On the other hand, the intrinsic viscosity of the polybutylene terephthalate resin (B) is usually from 0.6 to 1.8 dl/g, preferably from 0.7 to 1.4 dl/g, more preferably from 0.8 to 1.2 dl/g, as measured under the same conditions as above.

In the resin composition of the present invention, the proportion of the resin (A) is from 50 to 95 wt %, and the proportion of the resin (B) is from 5 to 50 wt %, based on the total amount of the resins (A) and (B).

If the proportion of the resin (A) is less than 50 wt %, the heat shrinkability and the bond strength by a solvent, of the resulting film, tend to be poor, and if the proportion of the resin (A) exceeds 95 wt %, the mechanical strength of the resulting film tends to be poor. The proportion of the resin (A) is preferably from 60 to 92 wt % (the resin (B): from 8 to 40 wt %), more preferably from 70 to 90 wt % (resin (B): from 10 to 30 wt %).

In the resin composition of the present invention, while the resins (A) and (B) satisfy the above-mentioned compositional ratio, the total amount of the dicarboxylic acid component other than terephthalic acid and the diol component other than a polyalkylene ether glycol and ethylene glycol in the composition, is preferably at least 10 mol %, more preferably at least 12 mol %, particularly preferably at least 15 mol % and preferably at most 40 mol %, more preferably at most 30 mol %, particularly preferably at most 25 mol %, based on the total amount of the total dicarboxylic acid component and the total diol component excluding the polyalkylene ether glycol in the resin composition. If the total amount of the dicarboxylic acid component other than terephthalic acid and the diol component other than the polyalkylene ether glycol and ethylene glycol, is less than the above range, the heat shrinkability of the resulting film tends to be poor. On the other hand, if it exceeds the above range, the mechanical strength of the resulting film tends to be poor.

Here, the total mol % of the dicarboxylic acid component other than terephthalic acid and the diol component other than the polyalkylene ether glycol and ethylene glycol, based on the total amount of the total dicarboxylic acid component and the total diol component excluding the polyalkylene ether glycol in the resin composition, is one obtained by ① converting the mol % of the component excluding the polyalkylene ether glycol in the respective polyester resins of the above resins (A) and (B), into the wt %, ② calculating the wt % in the composition from such wt % and the compositional % in the resin composition, and ③ converting the wt % again into the mol %.

It is preferred to incorporate fine particles to the resin composition of the present invention in order to impart properties such as an antiblocking property and a sliding property to the resulting film. The fine particles may be inorganic fine particles or organic fine particles, or a combination of both.

Specific examples of the inorganic fine particles include silica, alumina, titania, kaolin, clay, calcium carbonate, calcium phosphate, lithium fluoride, carbon black or precipitates derived from a catalyst such as an alkali metal, an alkaline earth metal or a phosphorus compound during the polymerization for polyesters. The organic fine particles may, for example, be various crosslinked polymers.

The average particle size of such fine particles is usually from 0.001 to 6 μm, preferably from 0.005 to 4 μm, more preferably from 0.01 to 3 μm. Here, the average particle size is a 50% volume average particle size (d50) as measured by a method such as a laser diffraction method, an electromagnetic wave scattering method such as a dynamic light scattering method, or a light transmission method such as a centrifugal sedimentation method. The content of the fine particles in the total resin composition is usually from 0.005 to 1 wt %, preferably from 0.01 to 0.6 wt %, more preferably from 0.02 to 0.5 wt %.

To incorporate inorganic fine particles and/or organic fine particles to the resin composition, it is common to incorporate them to either one or both of the resins (A) and (B). In the case of fine particles other than the precipitates derived from e.g. a catalyst, they may be added at the time of preparation of the resin composition as described hereinafter, or at the time of forming a film.

To the resin composition of the present invention, other thermoplastic resin, such as a polyolefin resin such as polyethylene, polypropylene, a maleic anhydride-modified product thereof or an ionomer, a polyamide resin, a polycarbonate resin or a polystyrene resin, or a thermoplastic elastomer, etc., may be incorporated within a range not to impair the effects of the present invention.

Further, to the resin composition of the present invention, an additive, such as an antioxidant of e.g. hindered phenol type, phosphorus acid ester type or thioether type, a photostabilizer of benzotriazole type, benzophenone type, benzoate type, hindered amine type or cyanoacrylate type, an inorganic or organic crystal nucleating agent, a molecular weight-controlling agent, an anti-hydrolysis agent, an antistatic agent, a lubricant, a release agent, a plasticizer, a flame retardant, a flame retardant adjuvant, a blowing agent, a coloring agent, a dispersion assisting agent, or a reinforcing material such as glass fiber, carbon fiber, mica, or potassium titanate fiber, may be incorporated.

To incorporate said other thermoplastic resin, thermoplastic elastomer, additive, reinforcing material, etc. to the resin composition of the present invention, they may usually be incorporated to either one or both of the resins (A) and (B). Specifically, they may be added at the time of preparation of the resin composition as described hereinafter, or at the time of forming a film.

The resin composition of the present invention is prepared usually by dry blending the resins (A) and (B) and the above-mentioned optional components and then melt-kneading the blend usually at a temperature of from 180 to 300° C., preferably from 200 to 280° C. usually for from 0.5 to 10 minutes, preferably from 1 to 5 minutes, by means of a melt-kneading apparatus such as a single screw or twin screw extruder.

At the time of the above preparation, the resins (A) and (B) are preferably preliminarily dried, so that deterioration or coloration during the preparation of the resin composition is prevented. In such a case, the water content of the resin is usually at most 400 ppm, preferably at most 200 ppm, more preferably at most 50 ppm. Further, instead of the above drying, it is preferred to maintain the molten resin retention section in the melt kneading apparatus in a reduced pressure state in order to suppress deterioration or coloration of the resin during the melt kneading and further to remove by-products, etc., formed by the kneading. In such a case, the pressure is set to be usually at most $2 \times 10^4$ Pa, preferably at most $3 \times 10^3$ Pa.

The intrinsic viscosity of the resin composition of the present invention, as measured by the same method as mentioned above, is usually from 0.5 to 1.0 dl/g, preferably from 0.6 to 0.9 dl/g, more preferably from 0.65 to 0.85 dl/g. If the intrinsic viscosity of the resin composition is less than 0.5 dl/g, the mechanical strength tends to deteriorate, and if the intrinsic viscosity of the resin composition exceeds 1.0 dl/g, the moldability tends to deteriorate.

The resin composition of the present invention can be molded into various molded products by common molding methods for thermoplastic resins. For example, it may be formed into a film or a sheet by extrusion. Further, such a film or sheet may be subjected to stretching to form a stretched film, which may then be subjected to heat forming such as vacuum forming or pneumatic forming to form a tray or a container. Further, by injection molding, blow molding, compression molding or the like, it can be molded into various molded products or into a molded product having a structure laminated with other materials.

The resin composition of the present invention is useful as a packaging material. It is particularly useful as a labeling material to cover outer surfaces of various bottles for beverages, as a sealing material for openings, or as a shrinkable film useful as a material to package, bind or cover industrial parts, etc.

The heat shrinkable film made of the resin composition of the present invention is formed, for example, by the following method. Namely, firstly, by a film-forming machine equipped with a T-die, the resin composition is melt-extruded into a sheet or a film and then cooled and solidified in contact with a cooled roll surface set at a temperature of from 10 to 80° C. by an electrostatic close contact method or a casting roll method to obtain a flat non-stretched sheet or film. Then, the non-stretched sheet or film is reheated, or the above-mentioned melt extrusion is followed by monoaxial stretching in a direction (transverse direction) perpendicular to the extrusion direction at a stretching temperature of from 60 to 120° C. for a stretching ratio of from 3 to 6 times by a stretching apparatus such as a tenter.

For the purpose of e.g. suppressing distortion or shrinkage in the extrusion direction (longitudinal direction), heat fixing treatment of heating at a temperature of from 60 to 100° C. after stretching, or longitudinal direction stretching treatment of stretching at a stretching ratio of usually at most 3 times, preferably at most 2 times in a direction perpendicular to the stretching direction before or after the above monoaxial stretching or at the same time as the monoaxial stretching, may suitably be carried out in combination.

Further, it is also possible to employ a method of monoaxially stretching in a longitudinal direction by e.g. a roll, while suppressing shrinkage or the like in a transverse direction by e.g. a tenter, by reversing the stretching direction as compared with the above-described method. Otherwise, a method of successively or simultaneously biaxially stretching, may be employed. Still further, a method may be employed wherein a sheet or film formed into a tube by a ring shaped die, is cut and opened, and then or while maintaining the tube shape, monoaxial or biaxial stretching treatment is applied.

The thickness of the stretched film made of the resin composition of the present invention is usually from 15 to 80 μm, preferably from 30 to 50 μm. If the thickness of the stretched film is less than 15 μm, the mechanical strength tends to deteriorate, and if the thickness of the stretched film exceeds 80 μm, uniform heat shrinkability tends to be hardly obtainable.

The stretched film made of the resin composition of the present invention usually has a haze of at most 10%, preferably at most 5%, in a thickness of 50 μm as measured in accordance with JIS K7105. The stretched film having a haze of at most 10% makes it easy to ascertain the content, when it is used as a labeling material or the like for e.g. a bottle for a beverage, and it is excellent also in ornamental appearance.

Now, the present invention will be described in further detail with reference to Examples. However, it should be understood that the present invention is by no means restricted to such specific Examples. The resin components and the evaluation methods employed in the following various Examples are as follows.

Resin Components
(1) Resin A1

A copolymerized polyethylene terephthalate resin which comprises a dicarboxylic acid component consisting of 90 mol % of terephthalic acid/10 mol % of isophthalic acid and a diol component consisting of 80 mol % of ethylene glycol/20 mol % of cyclohexane dimethanol and which has an intrinsic viscosity of 0.83 dl/g and contains 0.1 wt % of amorphous silica having an average particle size of 2.4 μm. Further, in the representation of the above resin composition, a component such as diethylene glycol formed as a by-product during the polymerization, was excluded (the same applies hereinafter).

(2) Resin A2

A copolymerized polyethylene terephthalate resin which comprises a dicarboxylic acid component consisting of 85 mol % of terephthalic acid/15 mol % of isophthalic acid and a diol component consisting of 85 mol % of ethylene glycol/15 mol % of cyclohexane dimethanol and which has an intrinsic viscosity of 0.79 dl/g and contains 0.1 wt % of amorphous silica having an average particle size of 2.4 μm.

(3) Resin A3 (for Comparative Example)

A copolymerized polyethylene terephthalate resin which comprises a dicarboxylic acid component consisting of 100 mol % of terephthalic acid and a diol component consisting of 65 mol % of ethylene glycol/35 mol % of cyclohexane dimethanol and which has an intrinsic viscosity of 0.80 dl/g and contains 0.1 wt % of amorphous silica having an average particle size of 2.4 μm.

(4) Resin A4 (for Comparative Example)

A copolymerized polyethylene terephthalate resin which comprises a dicarboxylic acid component consisting of 80 mol % of terephthalic acid/20 mol % of isophthalic acid and a diol component consisting of 100 mol % of ethylene glycol and which has an intrinsic viscosity of 0.83 dl/g and contains 0.1 wt % of amorphous silica having an average particle size of 2.4 μm.

(5) Resin A5 (for Comparative Example)

A copolymerized polyethylene terephthalate resin which comprises a dicarboxylic acid component consisting of 50 mol % of terephthalic acid/50 mol % of isophthalic acid and a diol component consisting of 50 mol % of ethylene glycol/50 mol % of cyclohexane dimethanol and which has an intrinsic viscosity of 0.70 dl/g and contains 0.1 wt % of amorphous silica having an average particle size of 2.4 μm.

(7) Resin B1

A polybutylene terephthalate resin which comprises a dicarboxylic acid component consisting of 100 mol % of terephthalic acid and a diol component consisting of 100 mol % of 1,4-butanediol and which has an intrinsic viscosity of 0.87 dl/g.

(8) Resin B2

A copolymerized polybutylene terephthalate resin which comprises a dicarboxylic acid component consisting of 90 mol % of terephthalic acid/10 mol % of isophthalic acid and a diol component consisting of 100 mol % of 1,4-butanediol and which has an intrinsic viscosity of 0.85 dl/g.

(9) Resin B3

A polybutylene terephthalate resin which comprises a dicarboxylic acid component consisting of 100 mol % of terephthalic acid and a diol component (excluding polytetramethylene ether glycol) consisting of 100 mol % of 1,4-butanediol and which has 10 wt % of a polytetramethylene ether glycol having a number average molecular weight of 1,000 copolymerized and has an intrinsic viscosity of 0.88 dl/g.

(10) Resin (B4)

A polybutylene terephthalate resin which comprises a dicarboxylic acid component comprising 90 mol % of terephthalic acid/10 mol % of isophthalic acid and a diol component (excluding the polytetramethylene ether glycol) consisting of 100 mol % of 1,4-butanediol and which has 10 wt % of a polytetramethylene ether glycol having a number average molecular weight of 1,000 copolymerized and has an intrinsic viscosity of 0.85 dl/g.

Evaluation Methods
(1) Particle Size of Particles

About 0.5 g of a resin sample was dissolved at 160° C. in about 25 cm³ of a mixed solvent of phenol/1,1,2,2-tetrachloroethane (weight ratio=40/60) and then cooled to 30° C., whereupon the particle size was measured by microtrack particle size distribution meter 7995 model, manufactured by Nikkiso K.K.

(2) Intrinsic Viscosity

About 0.25 g of a resin sample was dissolved at 110° C. in about 25 cm³ of a mixed solvent of phenol/1,1,2,2-tetrachloroethane (weight ratio=50/50) and then cooled to 30° C., whereupon the intrinsic viscosity was measured at 30° C. by a totally automatic solution viscometer ("2CH model DJ504", manufactured by Chuo Rika K.K.).

(3) Heat Shrinkability

A strip shape film of 20 mm×100 mm cut out so that the longer sides corresponded to the stretching direction, was used as a test sample. The sample was immersed in warm water of 80° C. for 10 seconds, then immediately withdrawn and left to stand at 23° C. for 10 minutes, whereupon the length in the longer side direction was measured, and from the measured value, the heat shrinkability was calculated. An average value of five test results was adopted. A shrinkability of 50% or higher is considered to be acceptable.

(4) Mechanical Strength

In accordance with JIS K7127, a film was punched out in the shape of No. 2 test specimen so that the stretching direction becomes the tensile direction, and it was pulled at a tensile speed of 50 mm/min, whereby the tensile breaking strength was measured. A tensile breaking strength of 20 kgf/mm² or higher is considered to be acceptable.

(5) Transparency

In accordance with JIS K7105, the haze was measured. A haze of 5.0% or less is considered to be acceptable.

(6) The Bonding Property by a Solvent (Bond Strength)

At 23° C., two films were put together so that the stretching directions were directed in the same direction, and a small amount of tetrahydrofuran was injected between the films. Then, by hand pressing, the films were bonded to each other and left to stand for 30 minutes, whereupon the films were manually peeled in the stretching direction, whereby the peeling property was evaluated by the following standards.

◯: Not peeled even when a substantial force is exerted.
Δ: Not readily peeled, but peeled when a substantial force is exerted.
X: Not bonded at all.

(7) Anti-Deterioration with Time of the Bonding Property

At 23° C., two films were put together so that the stretching directions were directed in the same direction, and a small amount of tetrahydrofuran was injected between the films. Then, by hand pressing, the films were bonded to each other and left to stand for 30 days, whereupon the films were manually peeled in the stretching direction, whereby the peel property was evaluated by the following standards:

◯: Not peeled even when a substantial force is exerted.
Δ: Not readily peeled, but peeled when a substantial force is exerted.
X: Not bonded at all.

EXAMPLES 1 TO 7 AND COMPARATIVE EXAMPLES 1 TO 6

Firstly, the resins (A) and (B) as identified in Table 1 were supplied to a twin-screw extruder (L/D=30, "TEM35", manufactured by Toshiba Kikai K.K.) and melt-kneaded at a screw rotational speed of 150 rpm at a temperature of 260° C. under a reduced pressure of $1 \times 10^2$ Pa, then extruded in the form of a strand, cooled in a water tank and then cut by a pelletizer to obtain pellets of a copolymerized polyester resin composition.

Then, the above resin composition pellets were supplied to a twin screw film-forming machine equipped with a T-die ("BT-30", manufactured by Plastic Kogaku Kenkyusho) and melt-extruded in the form of a film at a temperature of 260° C. under a reduced pressure of $1 \times 10^2$ Pa and then rapidly cooled in contact with the surface of a cooling roll provided with an electrostatic contacting device and set at a surface temperature of 40° C., to obtain a non-stretched film having a thickness of 200 μm.

Then, by a stretching apparatus (manufactured by Long Co.), the above non-stretched film was preliminarily heated at 95° C. and then stretched at a stretching ratio of 4 times in a direction (transverse direction) perpendicular to the extrusion direction, to obtain a stretched film having a thickness of 50 μm. The evaluation results of the obtained stretched film are shown in Tables 1 and 2.

TABLE 1

| Blend Ratio (wt %) | Resin | Examples | | | | | | |
|---|---|---|---|---|---|---|---|---|
| | | 1 | 2 | 3 | 4 | 5 | 6 | 7 |
| | A1 | 80 | — | 85 | 80 | 85 | — | 80 |
| | A2 | — | 85 | — | — | — | 80 | — |
| | A3 | — | — | — | — | — | — | — |
| | A4 | — | — | — | — | — | — | — |
| | A5 | — | — | — | — | — | — | — |
| | B1 | 20 | 15 | — | — | — | 10 | — |
| | B2 | — | — | 15 | — | — | — | 10 |
| | B3 | — | — | — | 20 | — | 10 | 10 |
| | B4 | — | — | — | — | 15 | — | — |
| Total proportion of copolymerized components (mol %) | | 20.0 | 19.9 | 20.7 | 21.1 | 20.2 | 21.8 | 21.9 |
| Intrinsic viscosity (dl/g) | | 0.76 | 0.74 | 0.76 | 0.77 | 0.75 | 0.73 | 0.76 |
| Physical properties of stretched film | Heat shrinkability (%) | 55 | 54 | 58 | 69 | 71 | 73 | 71 |
| | Tensile breaking strength (kgf/mm$^2$) | 25.9 | 23.8 | 23.4 | 21.2 | 20.9 | 21.3 | 20.8 |
| | Haze (%) | 3.5 | 3.4 | 2.2 | 3.1 | 2.5 | 2.5 | 2.9 |
| | Bonding strength | ◯ | ◯ | ◯ | ◯ | ◯ | ◯ | ◯ |
| | Resistance against deterioration with time of bond strength | Δ | Δ | ◯ | Δ | ◯ | ◯ | ◯ |

TABLE 2

| Blend Ratio (wt %) | Resin | Comparative Examples | | | | | |
|---|---|---|---|---|---|---|---|
| | | 1 | 2 | 3 | 4 | 5 | 6 |
| | A1 | — | — | — | — | 97 | — |
| | A2 | — | — | — | — | — | 30 |
| | A3 | 85 | — | — | — | — | — |
| | A4 | — | 85 | 80 | — | — | — |
| | A5 | — | — | — | 85 | — | — |
| | B1 | 15 | 15 | — | — | — | — |
| | B2 | — | — | 10 | 15 | 3 | — |
| | B3 | — | — | — | — | — | 70 |
| | B4 | — | — | 10 | — | — | — |
| Total proportion of copolymerized components (mol %) | | 23.1 | 16.0 | 17.7 | 50.8 | 16.1 | 38.1 |
| Intrinsic viscosity (dl/g) | | 0.73 | 0.76 | 0.76 | 0.66 | 0.75 | 0.78 |
| Physical properties of stretch- | Heat shrinkability (%) | 36 | 30 | 34 | 42 | 37 | 30 |
| | Tensile breaking strength (kgf/mm$^2$) | 19.0 | 19.4 | 18.3 | 15.3 | 26.5 | 16.5 |

TABLE 2-continued

| Blend Ratio (wt %) | Resin | Comparative Examples | | | | | |
|---|---|---|---|---|---|---|---|
| | | 1 | 2 | 3 | 4 | 5 | 6 |
| ed film | Haze (%) | 6.6 | 5.3 | 3.5 | 2.5 | 3.9 | 6.9 |
| | Bonding strength | Δ | Δ | Δ | ◯ | Δ | Δ |
| | Resistance against deterioration with time of bond strength | X | X | X | ◯ | Δ | X |

As described in the foregoing, the present invention provides a copolymerized polyester resin composition whereby a heat shrinkable film excellent in heat shrinkability, mechanical strength, transparency, bonding properties by a solvent, etc., can be obtained, and a stretched film made of such a resin composition. Thus, the industrial value of the present invention is substantial.

The entire disclosure of Japanese Patent Application No. 2001-149648 filed on May 18, 2001 including specification, claims and summary are incorporated herein by reference in its entirety.

What is claimed is:

1. A copolymerized polyester resin composition, comprising a polyethylene terephthalate resin (A) and a polybutylene terephthalate resin (B), wherein the proportion of said resin (A) is from 50 to 95 wt %, and the proportion of said resin (B) is from 5 to 50 wt %, based on the total amount of said resins (A) and (B):
   wherein resin (A) is a copolymerized polyethylene terephthalate resin, having a dicarboxylic acid component containing terephthalic acid as the main component and a diol component containing ethylene glycol as the main component copolymerized, wherein said dicarboxylic acid component contains isophthalic acid in an amount of from 3 to 30 mol % based on the total dicarboxylic acid component, and said diol component contains a cyclohexane dimethanol in an amount of from 3 to 40 mol % based on the total diol component,
   wherein said resin (B) is at least one member selected from the group consisting of:
   (B-i) a resin comprising a polybutylene terephthalate resin having isophthalic acid copolymerized in an amount of 1 to 50 mol % based on the total dicarboxylic acid component;
   (B-ii) a resin comprising a polybutylene terephthalate homopolymer (B1) and a copolymerized polybutylene terephthalate resin (B3) having a polyalkylene ether glycol copolymerized in an amount of from 1 to 80 wt % in the polybutylene terephthalate resin in a weight ratio of the resin (B1) to the resin (B3) of from 1:9 to 8:2;
   (B-iii) a resin comprising a polybutylene terephthalate resin (B2) having isophthalic acid copolymerized in an amount of 1 to 50 mol % based on the total dicarboxylic acid component, and a copolymerized polybutylene terephthalate resin (B3) having a polyalkylene ether glycol copolymerized in an amount of from 1 to 80 wt % in the polybutylene terephthalate resin; and
   mixtures thereof.

2. The resin composition according to claim 1, wherein said resin (B) comprises a polybutylene terephthalate resin having isophthalic acid copolymerized in an amount of 1 to 50 mol % based on the total dicarboxylic acid component.

3. The resin composition according to claim 1, wherein said resin (B) comprises a polybutylene terephthalate resin having isophthalic acid copolymerized in an amount of from 1 to 40 mol % based on the total dicarboxylic acid component.

4. The resin composition according to claim 1, wherein said resin (B) comprises a polybutylene terephthalate homopolymer (B1) and a copolymerized polybutylene terephthalate resin (B3) having a polyalkylene ether glycol copolymerized in an amount of from 1 to 80 wt % in the polybutylene terephthalate resin, in a weight ratio of the resin (B1) to the resin (B3) of 1:9 to 8:2.

5. The resin composition according to claim 1, wherein said resin (B) comprises a polybutylene terephthalate resin (B2) having isophthalic acid copolymerized in an amount of 1 to 50 mol % based on the total dicarboxylic acid component, and a copolymerized polybutylene terephthalate resin (B3) having a polyalkylene ether glycol copolymerized in an amount of from 1 to 80 wt % in the polybutylene terephthalate resin.

6. The resin composition according to claim 1, wherein the total amount of the dicarboxylic acid component excluding terephthalic acid and the diol component excluding a polyalkylene ether glycol and ethylene glycol in the composition, is from 10 to 50 mol % based on the total amount of the total dicarboxylic acid component and the total diol component excluding the polyalkylene ether glycol in the composition.

7. The resin composition according to claim 1, further comprising fine particles having an average particle size of from 0.001 to 6 μm in an amount of from 0.005 to 1 wt %.

8. A stretched film made of the resin composition as defined in claim 1.

9. The stretched film according to claim 8, wherein said resin (B) comprises a polybutylene terephthalate resin having isophthalic acid copolymerized in an amount of 1 to 50 mol % based on the total dicarboxylic acid component.

10. The stretched film according to claim 8, wherein said resin (B) comprises a polybutylene terephthalate resin having isophthalic acid copolymerized in an amount of from 1 to 40 mol % based on the total dicarboxylic acid component.

11. The stretched film according to claim 8, wherein said resin (B) comprises a polybutylene terephthalate homopolymer (B1) and a copolymerized polybutylene terephthalate resin (B3) having a polyalkylene ether glycol copolymerized in an amount of from 1 to 80 wt % in the polybutylene terephthalate resin, in a weight ratio of the resin (B1) to the resin (B3) of 1:9 to 8:2.

12. The stretched film according to claim 8, wherein said resin (B) comprises a polybutylene terephthalate resin (B2) having isophthalic acid copolymerized in an amount of 1 to 50 mol % based on the total dicarboxylic acid component, and a copolymerized polybutylene terephthalate resin (B3) having a polyalkylene ether glycol copolymerized in an amount of from 1 to 80 wt % in the polybutylene terephthalate resin.

13. The stretched film according to claim 8, wherein the total amount of the dicarboxylic acid component excluding terephthalic acid and the diol component excluding a polyalkylene ether glycol and ethylene glycol in the composition, is from 10 to 50 mol % based on the total amount of the total dicarboxylic acid component and the total diol component excluding the polyalkylene ether glycol in the composition.

14. The stretched film according to claim 8, further comprising fine particles having an average particle size of from 0.001 to 6 μm in an amount of from 0.005 to 1 wt %.

15. The stretched film according to claim 8, wherein said resin (B) comprises a polybutylene terephthalate resin having isophthalic acid copolymerized in an amount of from 2 to 30 mol % based on the total dicarboxylic acid component.

16. The stretched film according to claim 8, wherein said resin (B) comprises a polybutylene terephthalate resin having isophthalic acid copolymerized in an amount of from 10 to 30 mol % based on the total dicarboxylic acid component.

17. The stretched film according to claim 8, wherein said resin (B) comprises a polybutylene terephthalate resin having isophthalic acid copolymerized in an amount of from 1 to 40 mol % based on the total dicarboxylic acid component, and a copolymerized polybutylene terephthalate resin having a polyalkylene ether glycol copolymerized in an amount of from 1 to 80 wt % in the polybutylene terephthalate resin.

18. The stretched film according to claim 8, wherein said resin (B) comprises a polybutylene terephthalate resin having isophthalic acid copolymerized in an amount of from 2 to 30 mol % based on the total dicarboxylic acid component, and a copolymerized polybutylene terephthalate resin having a polyalkylene ether glycol copolymerized in an amount of from 1 to 80 wt % in the polybutylene terephthalate resin.

19. The stretched film according to claim 8, wherein said resin (B) comprises a polybutylene terephthalate resin having isophthalic acid copolymerized in an amount of from 10 to 30 mol % based on the total dicarboxylic acid component, and a copolymerized polybutylene terephthalate resin having a polyalkylene ether glycol copolymerized in an amount of from 1 to 80 wt % in the polybutylene terephthalate resin.

20. A heat shrinkable film made of the resin composition as defined in claim 1.

21. The heat shrinkable film according to claim 20, wherein said resin (B) comprises a polybutylene terephthalate resin having isophthalic acid copolymerized in an amount of 1 to 50 mol % based on the total dicarboxylic acid component.

22. The heat shrinkable film according to claim 20, wherein said resin (B) comprises a polybutylene terephthalate resin having isophthalic acid copolymerized in an amount of from 1 to 40 mol % based on the total dicarboxylic acid component.

23. The heat shrinkable film according to claim 20, wherein said resin (B) comprises a polybutylene terephthalate homopolymer (B1) and a copolymerized polybutylene terephthalate resin (B2) having a polyalkylene ether glycol copolymerized in an amount of from 1 to 80 wt % in the polybutylene terephthalate resin in a weight ratio of the resin (B1) to the resin (B3) to 1:9 to 8:2.

24. The heat shrinkable film according to claim 20, wherein said resin (B) comprises a polybutylene terephthalate resin (B2) having isophthalic acid copolymerized in an amount of 1 to 50 mol % based on the total dicarboxylic acid component, and a copolymerized polybutylene terephthalate resin (B3) having a polyalkylene ether glycol copolymerized in an amount of from 1 to 80 wt % in the polybutylene terephthalate resin.

25. The heat shrinkable film according to claim 20, wherein the total amount of the dicarboxylic acid component excluding terephthalic acid and the diol component excluding a polyalkylene ether glycol and ethylene glycol in the composition, is from 10 to 50 mol % based on the total amount of the total dicarboxylic acid component and the total diol component excluding the polyalkylene ether glycol in the composition.

26. The heat shrinkable film according to claim 20, further comprising fine particles having an average particle size of from 0.001 to 6 μm in an amount of from 0.005 to 1 wt %.

27. The heat shrinkable film according to claim 20, wherein said resin (B) comprises a polybutylene terephthalate resin having isophthalic acid copolymerized in an amount of from 2 to 30 mol % based on the total dicarboxylic acid component.

28. The heat shrinkable film according to claim 20, wherein said resin (B) comprises a polybutylene terephthalate resin having isophthalic acid copolymerized in an amount of from 10 to 30 mol % based on the total dicarboxylic acid component.

29. The heat shrinkable film according to claim 20, wherein said resin (B) comprises a polybutylene terephthalate resin having isophthalic acid copolymerized in an amount of from 1 to 40 mol % based on the total dicarboxylic acid component, and a copolymerized polybutylene terephthalate resin having a polyalkylene ether glycol copolymerized in an amount of from 1 to 80 wt % in the polybutylene terephthalate resin.

30. The heat shrinkable film according to claim 20, wherein said resin (B) comprises a polybutylene terephthalate resin having isophthalic acid copolymerized in an amount of from 2 to 30 mol % based on the total dicarboxylic acid component, and a copolymerized polybutylene terephthalate resin having a polyalkylene ether glycol copolymerized in an amount of from 1 to 80 wt % in the polybutylene terephthalate resin.

31. The heat shrinkable film according to claim 20, wherein said resin (B) comprises a polybutylene terephthalate resin having isophthalic acid copolymerized in an amount of from 10 to 30 mol % based on the total dicarboxylic acid component, and a copolymerized polybutylene terephthalate resin having a polyalkylene ether glycol copolymerized in an amount of from 1 to 80 wt % in the polybutylene terephthalate resin.

32. The resin composition according to claim 1, wherein said resin (B) comprises a polybutylene terephthalate resin having isophthalic acid copolymerized in an amount of from 2 to 30 mol % based on the total dicarboxylic acid component.

33. The resin composition according to claim 1, wherein said resin (B) comprises a polybutylene terephthalate resin having isophthalic acid copolymerized in an amount of from 10 to 30 mol % based on the total dicarboxylic acid component.

34. The resin composition according to claim 1, wherein said resin (B) comprises a polybutylene terephthalate resin having isophthalic acid copolymerized in an amount of from 1 to 40 mol % based on the total dicarboxylic acid component, and a copolymerized polybutylene terephthalate resin having a polyalkylene ether glycol copolymerized in an amount of from 1 to 80 wt % in the polybutylene terephthalate resin.

35. The resin composition according to claim 1, wherein said resin (B) comprises a polybutylene terephthalate resin having isophthalic acid copolymerized in an amount of from 2 to 30 mol % based on the total dicarboxylic acid component, and a copolymerized polybutylene terephthalate resin having a polyalkylene ether glycol copolymerized in an amount of from 1 to 80 wt % in the polybutylene terephthalate resin.

36. The resin composition according to claim 1, wherein said resin (B) comprises a polybutylene terephthalate resin having isophthalic acid copolymerized in an amount of from 10 to 30 mol % based on the total dicarboxylic acid component, and a copolymerized polybutylene terephthalate resin having a polyalkylene ether glycol copolymerized in an amount of from 1 to 80 wt % in the polybutylene terephthalate resin.

37. A copolymerized polyester resin composition comprising:

a polyethylene terephthalate resin (A) and a polybutylene terephthalate resin (B), wherein the proportion of said resin (A) is from 50 to 95 wt %, and the proportion of said resin (B) is from 5 to 50 wt %, based on the total amount of said resins (A) and (B):

wherein resin (A) is a copolymerized polyethylene terephthalate resin, having a dicarboxylic acid component containing terephthalate acid as the main component and a diol component containing ethylene glycol as the main component copolymerized, wherein said dicarboxylic acid component contains isophthalic acid in an amount of from 3 to 30 mol % based on the total dicarboxylic acid component, and said diol component contains a cyclohexane dimethanol in an amount of from 3 to 40 mol % based on the total diol component, wherein said resin (B) comprises a polybutylene terephthalate resin (B2) having isophthalic acid copolymerized in an amount of less than 50 mol % based on the total dicarboxylic acid component, and a copolymerized polybutylene terephthalate resin (B3) having a polyalkylene ether glycol copolymerized in an amount of from 1 to 80 wt % in the polybutylene terephthalate resin, and wherein the weight ratio of the resin (B2) to the resin (B3) is from 1:9 to 8:2.

38. A stretched film made of the resin composition as defined in claim 37.

39. A heat shrinkable film made of the resin composition as defined in claim 37.

* * * * *